No. 703,408.  
W. R. HARRIS.  
RUBBER TIRE.  
(Application filed Dec. 30, 1901.)
Patented July 1, 1902.
(No Model.)
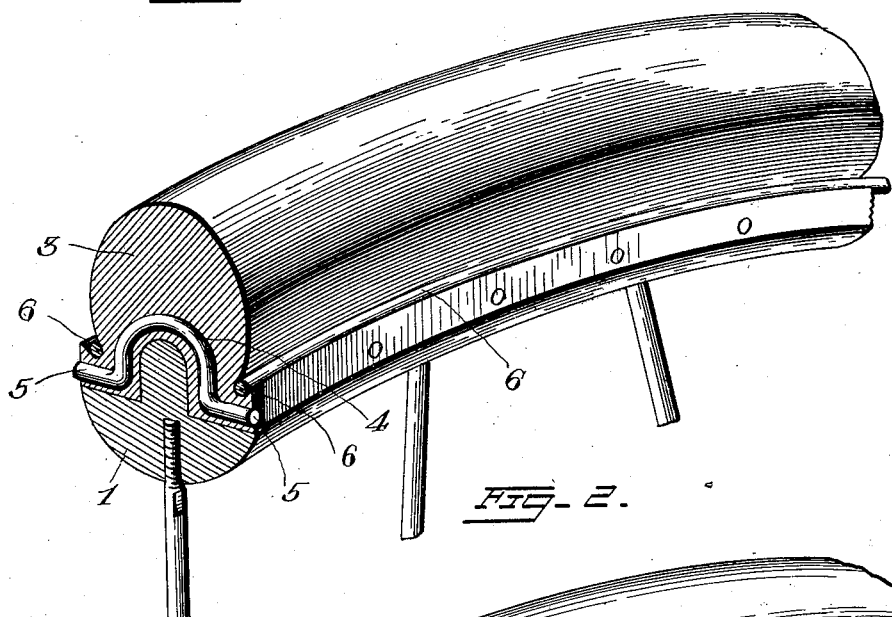
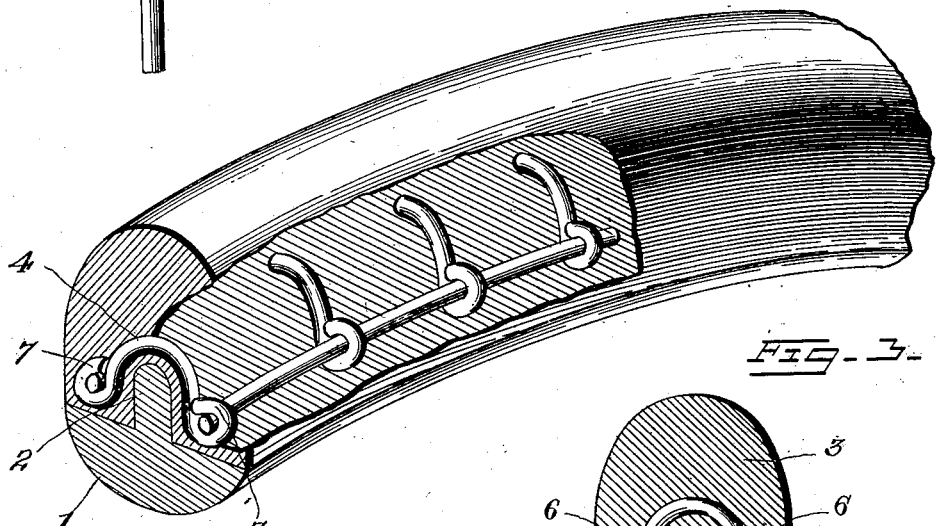
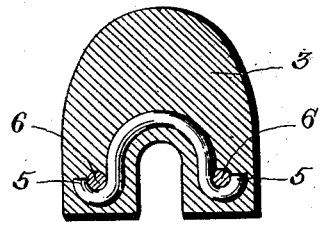
Witnesses  
R. A. Buswell  
J. C. Brown
Inventor  
William R. Harris.  
By W. J. Fitzgerald  
Attorneys

UNITED STATES PATENT OFFICE.

WILLIAM R. HARRIS, OF AKRON, OHIO.

RUBBER TIRE.

SPECIFICATION forming part of Letters Patent No. 703,408, dated July 1, 1902.

Application filed December 30, 1901. Serial No. 87,708. (No model.)

*To all whom it may concern:*

Be it known that I, WILLIAM R. HARRIS, a citizen of the United States, residing at Akron, in the county of Summit and State of Ohio, have invented certain new and useful Improvements in Rubber Tires; and I do hereby declare the following to be a full, clear, and exact description of the invention, such as will enable others skilled in the art to which it appertains to make and use the same.

My invention relates to tires for vehicles, and more particularly to rubber or other forms of resilient tires; and my invention consists of certain novel features of construction and combination of parts, the preferred form whereof will be hereinafter fully described, reference being had to the accompanying drawings, which are made a part of this application.

The object of my invention is to provide reliably-efficient means for sustaining the rubber tire against undue strain and holding the same upon the rim proper for its reception.

Other objects and advantages will be made clearly apparent from the following specification.

In the accompanying drawings, Figure 1 is a perspective view showing a section of the rim of a bicycle-wheel proper with my improved rubber tire. Fig. 2 is a similar view, partly in section, showing another form of construction which may be adopted in combining the reinforcing elements of my invention together. Fig. 3 is an end view showing another form of construction for the reinforcing devices.

For convenience the various elements of my invention will be designated by numerals, together with the coöperating accessories, the same numeral being applied to a similar part throughout the several views.

Referring to the numerals on the drawings, 1 designates the rim of a bicycle or other variety of wheel, it being understood that my improved tire is useful not only upon bicycles, but other forms of vehicles, as buggies, automobiles, &c. The rim 1 is provided with the centrally-disposed radial rib 2, which extends throughout the entire rim and is designed to be received by a similarly-formed groove or seat provided in the contiguous or central part of the tire proper, 3, formed of rubber or the like; and in order to hold the resilient material in the tire against spreading I provide the reinforcing or anchoring devices comprising the U-shaped body portion 4, provided with the laterally-extending terminals or branches 5. Designed to coöperate with said transversely-disposed stay-wires are the circumferentially-disposed wires or bands 6, one of said bands being disposed upon either side of the rubber tire within a suitable seat formed in this part of the tire proper, said seat being designed to hold the wires against casual displacement or spreading. In order, however, to more reliably hold the wires or bands 6 in place, I prefer in some instances to wrap the lateral branches 5 around a contiguous part of the bands 6, as indicated by the numeral 7 in Fig. 2. It will be understood that a plurality of the stay-wires 4, which are to be transversely embedded in the tire proper, may be connected to the bands 6 at suitable intervals prior to the molding process, and said bands and stay-wires after being thus assembled may be disposed in a proper form of mold and thus entirely inclosed or embedded within the material forming the rubber tire. By this arrangement it is obvious that the U-shaped body portion 4 will permit a suitable groove to be provided in the inner face of the tire to receive the rib 2, formed upon the rim 1, as previously described.

It will be understood that the U-shaped body portion 4 not only provides for the formation of a suitable groove, if desired, but said U-shaped part also permits the inner side of the tire to spread outward as incident to use, inasmuch as the resiliency of the wires will readily allow the U-shaped portions to open to considerable extent and at the same time insure that they will close again to a normal position when the weight upon the tire has been removed. By the arrangement, therefore, of these U-shaped sections in the middle part of the transversely-disposed stay-wires the inner side of the tire is left free to expand and contract, a very desirable and important desideratum. It will be obvious by reference to the drawings that whether the extreme outer ends of the transverse stay-wires are wrapped around or partly around the circumferential bands or whether said extreme ends are disposed straight outward through the tire, as shown in Fig. 1, said ends will still be in coöperation with the said circumferential bands, inasmuch as when said ends are extended straight outward they yet so reinforce the inner edge of the tire as to afford a more rigid base or support for said bands.

In Fig. 3 I have shown a transverse section of the tire, wherein it will be observed that the lateral branches 5 are not bent entirely around the bands 6, but the ends thereof are extended upward sufficiently to prevent lateral movement of said bands. It will be understood that the various elements comprising my invention may be very cheaply and expeditiously manufactured and readily assembled in their respective operative positions, and while I have described the preferred construction of the various parts I desire to comprehend in this application all substantial equivalents and substitutes that may fairly fall within the scope of my invention.

It will be clear that a wire of very small diameter may be employed both for the purpose of forming the transversely-disposed stays 4 and the bands 6, inasmuch as when said wires are embedded within the material forming the tire proper they will be protected against corrosion or the like. By providing the U-shaped section 4 I am not only able to dispose said sections within the body of the tire proper without interfering with the rib 2, but I also insure a proper degree of resiliency for this portion of the tire, inasmuch as the tire may slightly spread upon each side of the rib 2, as will be desirable and incident to the use thereof.

It will be observed in Fig. 1 that the circumferential wires 6 are disposed in the radial recesses or grooves formed in the side or base of the tire proper, while in Fig. 2 the circumferential wires 6 are wholly embedded within the material forming the rubber, thus completely housing all of the wires, protecting them against corrosion.

In Fig. 3 a transverse section of the rubber tire is illustrated, showing all of the wires wholly covered, and thereby so disposed as to be entirely out of sight, the formation and disposition of the transversely-disposed stay-wires being such as to in no wise interfere with the groove formed in the central portion of the base of the rubber tire proper. If preferred, the rib 2 may be formed or disposed so that it will extend in a zigzag line or staggered from side to side of the rim 1 and a correspondingly-shaped groove provided in the base of the tire, as such an arrangement of said rib and groove will prevent the tire from creeping or moving relatively about said rim, as will be obvious.

Having thus fully described my invention, what I claim as new, and desire to secure by Letters Patent, is—

1. A tire comprising a resilient body portion having a groove throughout its inner face and also provided upon each side with circumferential reinforcing-bands, said body portion also having a plurality of transversely-disposed wires, each wire section being bent upon itself near its middle portion to provide a U-shaped loop portion adapted to compensate for said groove, in combination with a rim having a rib fitting said groove, all combined substantially as specified and for the purpose set forth.

2. The combination with a rim having a centrally-disposed rib, of a resilient tire provided with a groove in its inner face fitting said rib, and also having upon each side a circumferential band and a plurality of reinforcing transversely-disposed wires embedded in the tire-body, each transverse wire having near its middle section a U-shaped member fitting around said groove, each end of said stay-wires being directed outward into engagement with the circumferential band, whereby when the base of the tire-body is spread said U-shaped portion will yield and again draw the tire back into a normal position, all substantially as specified and for the purpose set forth.

In testimony whereof I affix my signature in presence of two witnesses.

WILLIAM R. HARRIS.

Witnesses:
 FELIX MESSERLY,
 J. R. MELL.